United States Patent [19]

Hoge et al.

[11] Patent Number: 5,239,437
[45] Date of Patent: Aug. 24, 1993

[54] SELF IDENTIFYING UNIVERSAL DATA STORAGE ELEMENT

[75] Inventors: David T. Hoge, Arvada, Colo.; Michael W. Johnson, Cottage Grove, Minn.; John C. Owens, Arvada, Colo.

[73] Assignees: Minnesota Mining and Manufacturing Company, St. Paul, Minn.; Storage Technology Corporation, Louisville, Colo.

[21] Appl. No.: 870,578

[22] Filed: Apr. 17, 1992

Related U.S. Application Data

[63] Continuation-in-part of Ser. No. 744,456, Aug. 12, 1991.

[51] Int. Cl.⁵ .............................................. G11B 15/04
[52] U.S. Cl. ................................. 360/132; 360/60; 360/134; 242/199
[58] Field of Search ............... 360/132, 95, 60, 133, 360/134; 242/195, 197, 199; 250/568-570; 234/3, 4, 8, 9, 10, 102

[56] References Cited

U.S. PATENT DOCUMENTS

| | | | |
|---|---|---|---|
| 4,012,011 | 3/1977 | Saito | 242/199 |
| 4,769,732 | 9/1988 | Tanaka | 360/132 |
| 4,860,127 | 8/1989 | Takahashi et al. | 360/133 |

FOREIGN PATENT DOCUMENTS

| | | |
|---|---|---|
| 81-1024231 | 3/1981 | European Pat. Off. . |
| 83-2004675 | 4/1983 | European Pat. Off. . |
| 90-3021038 | 2/1990 | European Pat. Off. . |

*Primary Examiner*—Paul M. Dzierzynski
*Assistant Examiner*—Don Wong
*Attorney, Agent, or Firm*—Duft, Graziano & Forest

[57] ABSTRACT

The universal data storage element presents a of uniform form factor that enables the user to vary the contents to include a selection of media types to provide variable data storage and/or recording characteristics. The physical characteristics of the media located within the data storage element are identified by a coding arrangement located on the exterior housing of the data storage element. The data storage element self identification apparatus consists of a plurality of coding apertures arranged in a linear array and located along one edge of the exterior housing of the data storage element. These coding apertures are placed as a function of the type of media contained within the data storage element or various data management characteristics of this media. The coding apertures are implemented by inserting a block into a corresponding recess in the front of the housing. One of the apertures is manually definable by a slide mechanism to enable a user to set the write protect status of the media. A human readable mark is also provided on the slide mechanism to indicate the write protect state of the media. The insertable block can be color coded to provide a human readable definition of the pattern of coding apertures.

11 Claims, 2 Drawing Sheets

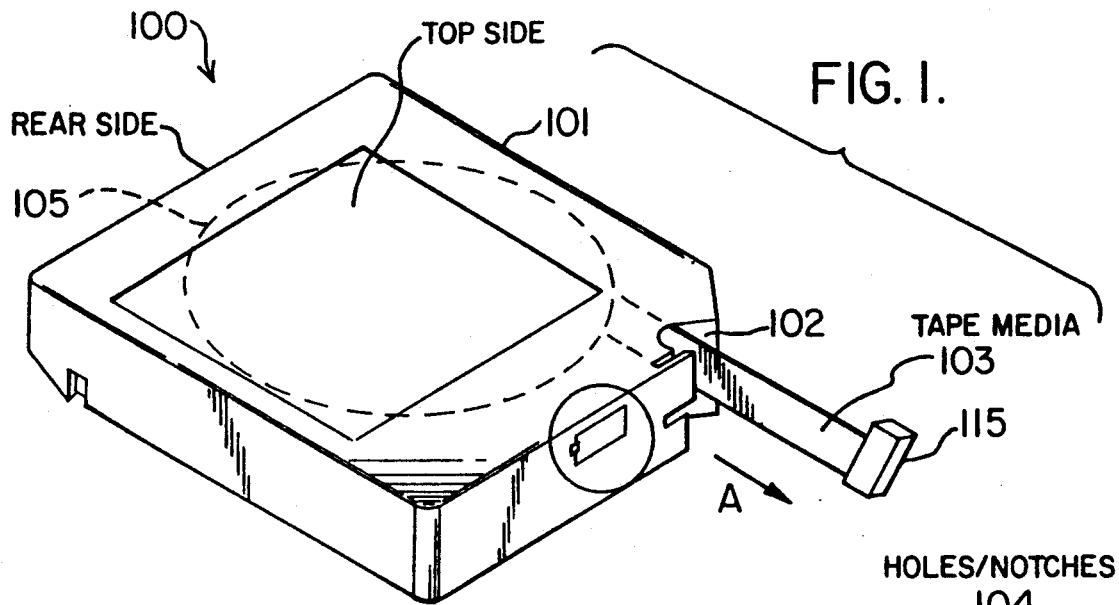
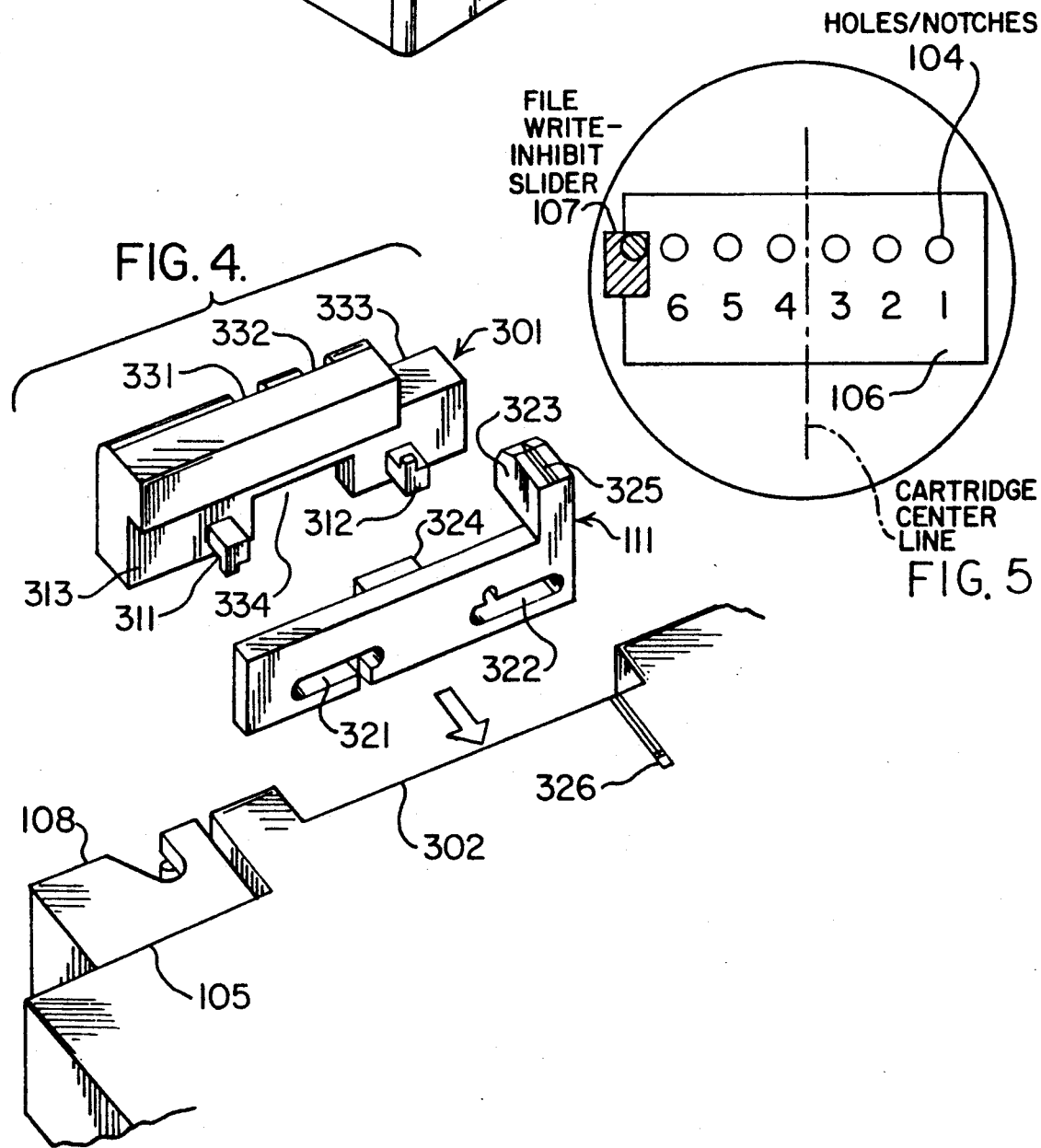

SELF IDENTIFYING UNIVERSAL DATA STORAGE ELEMENT

CROSS REFERENCE TO RELATED APPLICATION

This application is a continuation-in-part of U.S. Patent Application titled SELF IDENTIFYING UNIVERSAL DATA STORAGE ELEMENT, Ser. No. 07/744,456, filed Aug. 12, 1991 pending.

FIELD OF THE INVENTION

This invention relates to data storage systems and, in particular, to a data storage element form factor that can contain media of variable type and configuration, which media is identified by the use of a plurality of apertures imprinted on the exterior of the data storage element housing.

PROBLEM

A problem exists in data processing systems in that most data storage systems (recording media and hardware) fail to provide data storage capacity that is adaptable to the varying needs of the computer system. Existing data storage systems are inflexible, based on a single type of media that has predetermined mechanical, electrical, and operational constraints. A computer system user must therefore purchase a mixture of data storage systems to match the data storage capabilities with the nature of the data stored thereon. The selection of a data storage system also forces the user to restrict the media to a type that matches the installed data storage system. Often, the cost of additional incompatible data storage systems is prohibitive. The transition from one media to another is generally controlled by the need to change one of the primary data storage system characteristics such as volumetric efficiency of data stored per unit of space occupied, access performance (e.g. load, search, transfer times, etc.), cost, reliability, archival data storage capabilities (e.g. shelf life, environmental hardness, format standards, etc.), or management (e.g. media interchange, automated handling, catalogue systems, physical facilities, etc.).

For removable media types, the effects of such transitions are exacerbated by the use of large automated library systems. An example of these automated library systems is the 4400 Automated Cartridge System manufactured by Storage Technology Corporation, which provides economical and efficient handling of thousands of the industry standard 3480-type magnetic tape cartridges for an associated plurality of tape cartridge drive systems. An automated library system requires the user to commit to a significant investment in 3480-type tape cartridges and tape drives. The robotic media handling elements in an automated library system typically can not handle diverse types of media, since such robots are designed to handle a specific media having a specific form factor. Furthermore if it were possible to introduce different media of similar form factor, media management requires a way to identify and differentiate individual media units. Thus, while the automated library system provides tremendous data storage and data retrieval performance improvement, it has the disadvantage of constraining the user to a specific media having a specific form factor since existing removable media are unique and not interchangeable.

SOLUTION

The above described problems are solved and a technical advance achieved in the field by the self identifying universal data storage element of the present invention. Existing removable media data storage and retrieval systems, whether manual or robotic, are predicated on the use of removable data storage elements of predefined and uniform external dimensions, internal structure, media and data recording characteristics. The universal data storage element of the present invention presents a data storage element of uniform form factor but that enables the user to vary the contents to include a selection of media types. These media types are used to provide variable data storage and/or recording characteristics.

This universal data storage element also includes coding apparatus to identify the media contents of the universal data storage element. This coding apparatus enables the user to use multiple types of media in an automated library system or a manually operated media storage and retrieval system, since the form factor of all of the data storage elements contained therein is uniform. The universal data storage element includes a plurality of coding apertures on the exterior thereof to automatically identify the data storage capability of the data storage element to ensure that the data storage element is consistent with the data recording technique used by devices associated with either storage and retrieval system.

In the preferred embodiment disclosed herein, the industry standard 3480-type magnetic tape cartridge form factor is used to illustrate the invention. The 3480-type magnetic tape cartridge consists of a substantially rectangular shaped exterior housing which contains a single reel of tape media, which tape media has a leader block affixed to one end. The leader block is exposed through an opening in the exterior housing of the tape cartridge, for use by an associated tape drive to retrieve the tape media from the tape cartridge. The physical characteristics of the tape media located within this data storage element are identified by a coding arrangement located on the exterior housing of the data storage element. A drive element can thereby decode the media type and, if compatible, access the media stored in the data storage element. The coding identifies the media type without requiring the drive element to first access the media located within the data storage element.

In the disclosed embodiment, the data storage element self identification apparatus consists of a plurality of coding holes or slots arranged in a linear array and located along one edge of the exterior housing of the data storage element. These coding holes are placed in the housing during the data storage element manufacturing process to define the type of media contained within the data storage element or various data management characteristics of this media. The coding holes can include a user settable coding hole to indicate the write protect status of the magnetic tape contained within the data storage element. This write protect status hole is set to be either open or closed by use of a slide mechanism to enable the user to set the write protect state of the data storage element. Additional coding holes are preprogrammed into the exterior housing of the data storage element. This is generally accomplished by the use of a recess formed in one surface of the exterior housing juxtaposed to the opening through which the leader block is accessed. A block shaped to snap fit and lock within the recess is inserted into the recess during the cartridge manufacturing process. The block contains a plurality of apertures to define the data storage characteristics of this data storage element. The block is configured to sandwich a slide mechanism between the block and the housing of the data storage element. The block includes an aperture therein to enable a user to access a projection on the slide mechanism to set the slide in either of two positions which block or open a predefined aperture in the block to set the write protect status of the tape media. The block can be color coded to provide a visual indication of the particular pattern of coding holes contained therein. A further human readable indicator can be provided on the slide mechanism to align with a corresponding human readable mark on the housing when the slide mechanism is set to indicate that the data storage element is not write protected. The drive element can therefore automatically determine whether this data storage element can be processed by simply probing the array of coding holes with a probe element, such as a photodetector or a corresponding array of decoding pins.

Thus, the use of a fixed form factor self identifying universal data storage element enables the user to equip a library system with a plurality of diverse drive elements, each requiring a different type of media. The variability of the media within the universal data storage element and the associated interface elements enables the physical handling of every data storage element in a uniform manner without the likelihood of damage to the drive elements due to the use of these coding holes in the data storage element exterior housing.

BRIEF DESCRIPTION OF THE DRAWING

FIG. 1 illustrates the overall architecture of the universal data storage element, including one embodiment of the array of coding holes on the exterior housing of the universal data storage element;

FIGS. 2-4 illustrate details of one embodiment of the array of coding holes.

FIG. 5 illustrates details of one embodiment of the array of coding holes.

DETAILED DESCRIPTION

Figure 2:
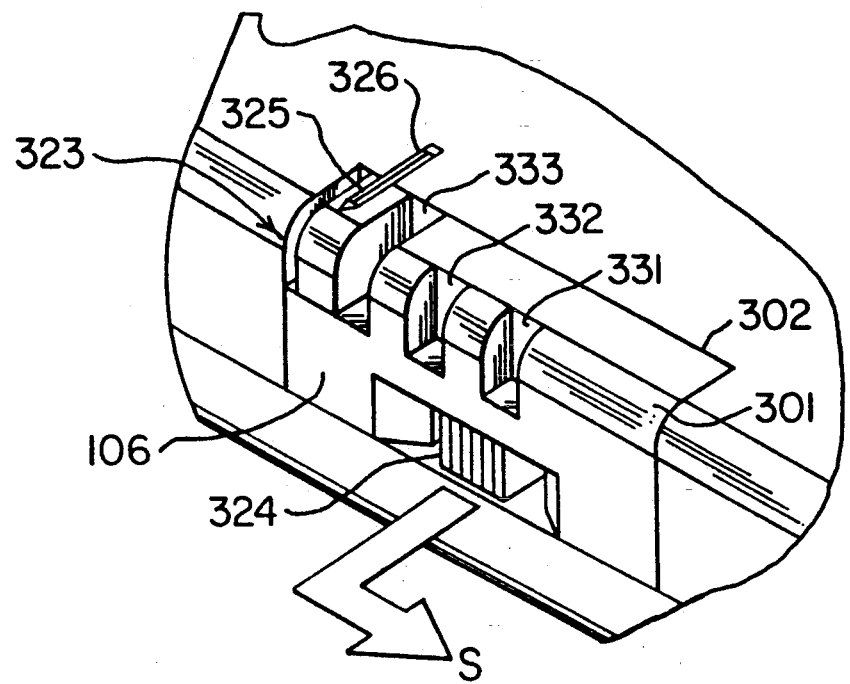

Existing removable media data storage and retrieval systems, whether manual or robotic, are predicated on the use of removable data storage elements of predefined and uniform external dimensions, internal structure, media and data recording characteristics. The universal data storage element of the present invention presents a uniform form factor data storage element but enables the user to vary the contents to include a selection of media types used therein to provide variable data storage and/or recording characteristics. This enables the user to use multiple types of media in an automated library system or a manually operated media storage and retrieval system, since the form factor of all of the data storage elements contained therein is uniform. Mismatch between the media contained in the data storage element and the drive element is prevented by the use of a plurality of coding holes placed on the exterior housing of the data storage element to identify the physical characteristics of the media contained therein. The drive element automatically senses the presence of a predefined pattern of these holes to determine whether the data storage element can be processed on this drive element.

Universal Data Storage Element Architecture

FIG. 1 illustrates the overall architecture of the universal data storage element 100. This data storage element 100 consists of a housing 101 that substantially matches the industry standard 3480-type magnetic tape cartridge in exterior dimensions. Housing 101 includes an opening 102 in one corner therein to provide access to the media located within housing 101. Within housing 101, the universal data storage element 100 contains, for example, a reel 105 that contains a tape media 103, which reel 105 is rotatably positioned within the housing 101. Tape media 103 is extensible from a loaded position, wherein it is located fully within housing 101, to an extracted position, wherein all or part of tape media 103 is extracted from housing 101 and wound on a take up reel (not shown) located external to housing 101 on a tape drive element into which the data storage element 100 has been placed.

Media Retrieval

In order to extract the tape media 103 from the housing 101, a leader block 115 is used. This leader block 115 is affixed to one end of the tape media 103 wound on reel 105 to provide a mechanical point of contact for a media withdrawal element in the associated tape drive element. A mounting pin mechanism in the tape drive element receives leader block 115 and pulls the associated tape media 103 out of cartridge housing 101 by moving leader block 115 in the direction indicated by arrow A.

Media variations and Differentiation

The commercially available 3480-type magnetic tape cartridge was designed to use a singe type of magnetic tape. In contrast, the universal data storage element 100 is adapted to use various media types. These variations in media can include type of tape (magnetic or optical), data recording format (longitudinal or helical) as well as a variety of different data processing formats, tape dimensions (thick or thin/length of tape on reel), magnetic coating on the tape (iron-oxide or chromium dioxide or barium ferrite), write protection status, etc. There is the potential for damage to the media contained within the universal data storage element 100, or the associated drive element if the media is incompatible with the associated drive element and equally problematic, irrevocable loss of data recorded on the cartridge. One method of avoiding this problem is to "encode" the universal data storage element 100 to identify the media stored therein. One encoding scheme is the use of physical or optical features on the exterior of housing 101. An example of such features is shown in FIG. 5 and entails the use of a pattern of holes, ridges or indentations 104 (such as holes, slots or notches) located on one side of housing 101, which pattern identifies the media and/or type of recording thereon contained within universal data storage element 100. A coding detection apparatus, such as a photodetector or a corresponding array of decoding pins, in the drive element detects the presence and pattern of holes 104 to determine whether the media contained in this universal data storage element 100 is compatible with the drive element. The presence of an incompatible media would abort the loading process prior to the drive element attempting to access the media contained within the data storage element.

Coding Configuration

The coding apparatus used in data storage element 100 consists of a set of coding marks 104 which are mechanically imprinted into at least one exterior surface of the housing 101. In FIG. 1, the coding marks 104 consist of a linear array of apertures comprising a plurality of holes or notches in one exterior surface of housing 101 and, in particular, in the front face of housing 101. The plurality of coding marks 104 are located within a rectangular area 106 located, for illustrative purposes, symmetrically about the center line of the data storage element (cartridge) 100 substantially juxtaposed to the opening 102. The rectangular area 106 contains up to six holes or notches 104 configured in a linear array with three of the holes or notches positioned on either side of the center line of the data storage element 100.

Write Inhibit Mark

One of these holes, for example the hole labeled 6 on FIG. 1, is used to indicate the write inhibit status of the media contained within data storage element 100. This write inhibit hole 6 is settable by the user by means of a slider 107 that can be positioned to block or open the sixth hole in the linear array of holes 104 illustrated in FIG. 1. Thus, the drive element can determine whether the files stored on this media are write inhibited by sensing whether hole 6 is blocked via the use of a photodetector positioned opposite this hole or by use of a sensing pin which probes the front surface of the data storage element 100 to determine whether the sixth or write inhibit hole is blocked by the slider 107.

Media Identification

The remaining five coding hole positions illustrated in FIG. 1 provide thirty-two possible coding configurations, since the presence or absence of a hole represents a binary data bit. Since the media is placed in the data storage element 100 by the manufacturer during the manufacturing process, the coding holes 104 are also placed on the front side of the data storage element 100 during the manufacturing process to reflect the type of media located inside of housing 101. Since the 3480-type magnetic tape cartridge form factor lends itself for use with tape media, there are a number of possible configurations of tape media or other types of recording media that can be used within data storage element 100. For example, the tape media can be either of a magnetic or a optical writable nature. Similarly, the data recording format used on this tape media can vary from the standard longitudinal multi-track format used in present tape drives to a helical data recording format such as that commonly found in video tape drive elements. Additionally, the tape media can be a standard thickness or a thin tape. Additional coding information can be provided by use of the coding holes 104 to indicate whether the tape media contained in the housing 101 is of a thick or thin dimension and, more specifically, the nominal length of tape that is provided on reel 105. Since there are a finite number of standard tape lengths, this information represents only a few possible choices and does not preclude too many of the thirty-two possible coding variations provided by coding holes 104. Additionally, the type of coating that is used on the tape media is of significance for certain drive elements and coding information can reflect whether the magnetic coating applied to the tape media is of a standard iron-oxide or chromium dioxide or barium ferrite material composition.

The coding holes 104 can reflect all of the physical characteristics of the tape media that is wound of reel 105 contained within the housing 101 of data storage element 100. In addition, the data format and content can similarly be reflected by appropriate selection of a pattern of the coding holes 104. Since the pattern of six holes illustrated in FIG. 1 represent but one embodiment of this concept, it is expected that various other configurations of coding holes are possible for use on the data storage element 100.

Coding Hole Configuration

The exact positioning and configuration of the coding holes 104 may be a function of the decoding apparatus used within the corresponding drive element in order to sense the presence or absence of the coding holes 104. In fact, the coding holes 104 need not be the round holes illustrated in FIG. 1 but can be rectangular slots the front surface of housing 101 or a series of ridges embossed therein, which ridges would be mechanically sensible by a microswitch having a sensing wheel attached thereto. Finally, the rectangular area 106 can further be color coded in order to simplify identification of the media contained within the data storage element 100 by a human operator. The color coding can be a monochromatic designation that, as is illustrated in FIG. 1, completely surrounds the pattern of coding holes 104 imprinted in the front surface of housing 101. Alternatively, a series of color bars can be used to reflect the five different manufacturer supplied coding holes 104.

In order to simplify the detection of the coding holes 104, a number of mechanical configurations can be used to implement this coding scheme. In particular, a shallow circular mark can be provided in each of the five positions illustrated in FIG. 1 to indicate the location of coding holes 104. Only the coding holes that are appropriate for this particular media type would be completed, thereby enabling mechanical or optical or operator differentiation between actual holes and simply hole positions. Similarly, the hole positions can be designated by a simple target color pattern identifying a hole position. This target designation may simplify differentiation between standard 3480-type magnetic tape cartridges and universal data storage element cartridges which contain a pattern of coding holes. The rectangular area 106 that is color coded can be a color coded insert that is integrated into the front surface of housing 101 during the manufacturing process or an area that is colored after the manufacture of housing 101.

Alternate Embodiment

Figure 3:
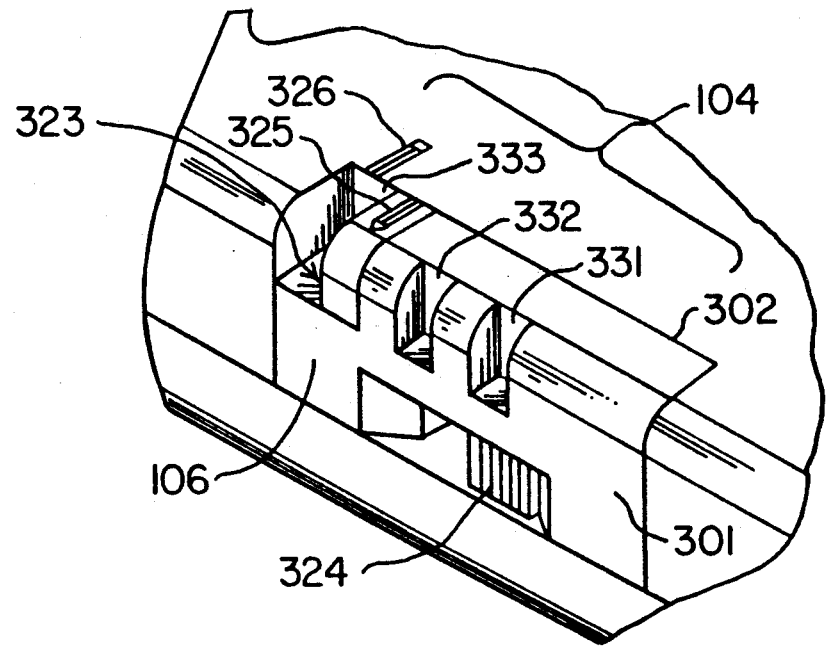

FIGS. 2–4 illustrate an alternative embodiment of the coding holes 104 on the front surface of housing 101. In particular, as noted above, the rectangular area 106 is implemented in the embodiment of FIGS. 2–4 as a recess 302 in the front surface of housing 101 substantially juxtaposed to the opening 102. The recess is substantially rectangular in shape, of predetermined dimensions and adapted to receive a block of material 301 that has exterior dimensions that substantially match the dimensions of the recess 302. The block 301 includes a plurality of apertures 104 therein arranged in a substantially linear array across the long dimension of the front surface of housing 101. The block 301 is designed to be snap fitted the recess 302 in a manner that the exterior surfaces of the block 301 are substantially in alignment with the corresponding exterior surfaces of housing 101 and to thus be locked in place. Included in the plurality of apertures 104 in the block, is at least one aperture 333 that is used to denote the write protect status of the tape media contained within the data storage element 100. As illustrated in attached figures, the write protect aperture 333 is substantially larger than the other apertures contained in the block 301. The enlarged nature of this aperture 333 is such that it can accept a moveable member 323 that can be placed only in one of two positions as illustrated respectively in FIGS. 2 and 3. In the position illustrated in FIG. 3, the projection is aligned with the extreme edge of the block 301 and includes thereon a human readable mark 325 that aligns with a corresponding human readable mark 326 on a top surface of housing 101 to indicate when the projection 323 is in this position that the tape media contained within housing 101 is not write protected. The second position of this projection 323 is illustrated in FIG. 2 wherein it is moved to the opposite end of the enlarged aperture 333 and the human readable marks 325, 326 on this projection 323 and housing 11 no longer align to indicate to the user that the tape media contained within housing 101 can not be written and the data storage element is therefore write protected. The movement of this projection 323 is accomplished by the use of a slide mechanism 111 that consists of an elongated piece of material having two projections 323, 324 thereon. The first of these projections 323 represents the write enable defining projection that protrudes through the aperture 333 in the linear array of apertures 104 noted above. The second projection 324 is located a distance away from projection 323 on this member and protrudes through an opening 334 in the face of the block 301 to enable a user to activate the slide mechanism to move between the positions illustrated in FIGS. 2 and 3. The block 301 includes a recess 313 on the backside thereof to enclose at least part of the slide mechanism 111 and to sandwich the slide mechanism 111 between the block 301 and housing 101. Thus, the block 301 when inserted into the recess 302 creates a channel between the block 301 and the housing 101 in which the slide mechanism 111 is moveable by the user relocating the second projection 324 of the slide mechanism 111 between the two positions illustrated in FIGS. 2 and 3. The block 301 can be color coded as noted above to illustrate in human readable form the primary contents of housing 101 without the user having to decode the linear array of apertures 104 contained in the block 301.

Slide Mechanism for Coding Apertures

FIG. 4 illustrates an exploded view of the slide mechanism used to open/close aperture 333 illustrated in FIGS. 2 and 3. The block 301 is shown in FIG. 4 from the back side thereof. The block includes a pair of pins 311, 312 which pins are of a shape and configuration to fit through mating oval holes 321, 322, respectively, that are formed in slide mechanism 111. The tabs on the end of pins 311, 312 fit through corresponding openings that extend from the end of oval holes 321, 322 to enable slide mechanism 111 and block 301 to lock together in a slidable relationship. Slide mechanism 111 includes a projection 324 that fits through opening 334 in block 301 which projection 324 can be accessed by a user through opening 334 to move slide mechanism 111 in the direction S indicated in FIG. 2. The motion of slide mechanism 111 in direction S causes projection 323 located at one end of slide mechanism 111 to be moved from one end of the settable aperture 333 to the other end thereof to indicate the write protect status of magnetic tape 103 contained in data storage element 100. A human readable mark 325 on the top of projection 323 mates with a corresponding human readable mark 326 on the top of housing 101. The alignment of marks 325 and 326 indicate the write enable status of the magnetic tape 103 as defined by the physical position of projection 323 within aperture 333. A lack of alignment of marks 325 and 326 indicate that projection 323 is positioned at the opposite end of aperture 333 thereby indicating to the associated drive element that the magnetic tape 103 contained in data storage element 100 is write protected. Therefore, when slide mechanism 111 is coupled to block 301 by the use of pins 311, 312 through mating oval holes 321, 322, slide mechanism 111 can be moved in direction S by a user activating the slide mechanism 111 using projection 324 accessible through opening 334 to therefore manually define the aperture configuration 333 by relocating projection 323 therein. The remaining fixed apertures 331, 332 are mechanically inscribed into block 301 during the manufacturing process and fixedly define the various characteristics of magnetic tape 103 located in data storage element 100. It is obvious from viewing block 301 that a number of other aperture positions are available to be used on block 301. Therefore, the pattern of apertures 104, both fixed and moveable, in block 301 is a function of the implementation of the magnetic tape 103 in the data storage element 100. Depending on the magnetic tape 103 inserted into exterior housing 101, different implementations of block 301 would be used to form the mechanism illustrated in FIGS. 2-4.

Summary

The universal data storage element of the present invention provides a uniform media form factor of well defined exterior dimensions for a multitude of data storage media. The use of a consistent exterior housing form factor for the various types of media simplifies the data storage element storage and retrieval operation. A computer system can therefore be equipped with an automated library system or a uniform storage and retrieval system of a manual nature to handle diverse types of media. The use of the universal data storage element enables the user to store data on media that is appropriate for the nature of the data as well as provide a variable selection of drive elements for the computer system without the logistical complexities of diverse and incompatible media types. The universal data storage element supports various types of magnetic tape as well as predefined data management functions assigned to this particular media element.

While a specific embodiment of this invention has been disclosed, it is expected that those skilled in the art can and will design alternate embodiments of this invention that fall within the scope of the appended claims.

I claim:

1. In a data storage cartridge that comprises a substantially rectangular housing for enclosing a data storage media, said data storage cartridge capable of being inserted into a unit for reading/writing data on said data storage media, apparatus for identifying said data storage media, comprising:

wherein said housing includes a recess of predefined dimensions in one exterior surface thereon;

means, insertable into said recess, for providing a plurality of coding apertures; and means, sandwiched between said providing means and said housing and slidable with respect to said providing means, for defining at least one of said coding apertures, including:

a first projection for blocking said at least one aperture when said defining means is in a first position; and a second projection, accessible via an access slot in said providing means for enabling a user to slide said defining means into said first position to thereby manually define at least one of said coding apertures.

2. The apparatus of claim 1 wherein said providing means includes:

a block of exterior dimensions substantially the same as said predefined dimensions of said recess and including a recess on one side thereof to enclose at least a part of said enabling means between said providing means and said housing.

3. The apparatus of claim wherein said providing means includes:

color coding, substantially surrounding said plurality of coding apertures.

4. The apparatus of claim 1 wherein said coding apertures are substantially rectangular in shape.

5. The apparatus of claim wherein said plurality of coding apertures are aligned in a linear array on one surface of said providing means.

6. The apparatus of claim wherein said enabling means includes:

indicator means alignable with a corresponding indication on said housing to denote in human readable form the state of said at least one aperture.

7. In a magnetic tape cartridge that comprises a substantially rectangular housing for enclosing a single reel of magnetic tape, apparatus for defining data storage characteristics of said magnetic tape, comprising:

a recess of predefined dimensions in one exterior surface of said housing;

means, insertable into said recess, for providing a plurality of coding apertures to define said data storage characteristics of said magnetic tape; and means, sandwiched between said providing means and said housing and slidable with respect to said providing means, for enabling a user to manually define at least one of said coding apertures, including:

a first projection for blocking said at least one aperture when said enabling means is in a first position; and a second projection, accessible via an access slot in said providing means, for enabling a user to slide said enabling means into said first position.

8. The apparatus of claim 7 wherein said magnetic tape cartridge includes an opening in one corner thereof for accessing said magnetic tape, said recess being located proximate said opening and on the same side of said housing as said opening.

9. The apparatus of claim 7 wherein said providing means includes:

color coding, substantially surrounding said plurality of coding apertures.

10. The apparatus of claim 7 wherein said plurality of coding apertures are aligned in a linear array on one surface of said providing means along a long dimension of said magnetic tape cartridge housing.

11. The apparatus of claim 7 wherein said at least one aperture defines a write protect state of said magnetic tape, said enabling means includes:

human readable indicator means alignable with a corresponding human readable indication on said housing to denote said write protect state of said magnetic tape.

* * * * *